(12) United States Patent
Singh et al.

(10) Patent No.: US 9,225,524 B2
(45) Date of Patent: *Dec. 29, 2015

(54) FORWARDING E-MAIL FROM A WIRELESS DEVICE

(71) Applicant: BlackBerry Limited, Waterloo (CA)

(72) Inventors: Ravi Singh, Toronto (CA); Alexander Sherkin, Woodbridge (CA); Neil Patrick Adams, Waterloo (CA); Nikhil Vats, Vaughan (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,157

(22) Filed: May 26, 2014

(65) Prior Publication Data

US 2014/0258722 A1    Sep. 11, 2014

Related U.S. Application Data

(63) Continuation of application No. 13/281,834, filed on Oct. 26, 2011, now Pat. No. 8,738,909.

(60) Provisional application No. 60/408,240, filed on Oct. 29, 2010.

(51) Int. Cl.
*H04L 9/32* (2006.01)
*H04L 12/58* (2006.01)
*H04L 12/18* (2006.01)

(52) U.S. Cl.
CPC *H04L 9/32* (2013.01); *H04L 51/00* (2013.01); *H04L 51/063* (2013.01); *H04L 51/14* (2013.01); *H04L 12/1859* (2013.01); *H04L 51/08* (2013.01); *H04L 51/38* (2013.01)

(58) Field of Classification Search
None
See application file for complete search history.

(56) References Cited

U.S. PATENT DOCUMENTS

| | | | | |
|---|---|---|---|---|
| 2004/0090457 | A1* | 5/2004 | Serdy et al. | 345/752 |
| 2004/0093414 | A1* | 5/2004 | Orton | 709/225 |
| 2005/0071432 | A1* | 3/2005 | Royston, III | 709/206 |
| 2007/0038718 | A1* | 2/2007 | Khoo et al. | 709/206 |
| 2008/0155026 | A1* | 6/2008 | Daniels-Farrar et al. | 709/206 |
| 2009/0063647 | A1* | 3/2009 | Backholm et al. | 709/206 |
| 2009/0132663 | A1* | 5/2009 | Kritt et al. | 709/206 |
| 2010/0229246 | A1* | 9/2010 | Warrington et al. | 726/28 |
| 2010/0250691 | A1* | 9/2010 | Tomkow | 709/206 |
| 2010/0293238 | A1* | 11/2010 | Nottingham et al. | 709/206 |
| 2011/0293135 | A1* | 12/2011 | Irons et al. | 382/101 |
| 2012/0066314 | A1* | 3/2012 | Hardy | 709/206 |
| 2012/0079034 | A1* | 3/2012 | Farrell et al. | 709/206 |
| 2012/0166558 | A1* | 6/2012 | Kim et al. | 709/206 |

* cited by examiner

*Primary Examiner* — Shewaye Gelagay
*Assistant Examiner* — Khoi Le
(74) *Attorney, Agent, or Firm* — Moffat & Co.

(57) ABSTRACT

A system and method of sending an e-mail message associated with a wireless device is provided. A request to forward or reply to an original e-mail message is sent from the wireless device to a server. The request contains one or more recipients and includes a message identifier of an original e-mail message. A portion indicator is provided for retrieving portions of the original e-mail message identified by the message identifier. An e-mail message is sent to the one or more recipients comprising any added user text and the one or more retrieved portions of the original e-mail message such that text of the original message that the user may not be aware is not forwarded to new recipients.

19 Claims, 10 Drawing Sheets

FORWARDING E-MAIL FROM A WIRELESS DEVICE

CROSS-REFERENCE TO RELATED APPLICATIONS

This application is a continuation of application Ser. No. 13/281,834 filed Oct. 26, 2011 which is a non provisional of application Ser. No. 61/408,240 filed Oct. 29, 2010, the disclosure of which is hereby incorporated by reference in its entirety for all purposes.

TECHNICAL FIELD

The present disclosure relates to sending electronic mail (e-mail) and in particular to forwarding of electronic e-mail from a wireless device,

BACKGROUND

On a wireless device, it is typical that the device receives only small portions of e-mail messages directed to a recipient, starting from the beginning, as needed to conserver bandwidth. Additional portions of the e-mail message are delivered to the user on an as needed basis. For example, as the user scrolls down on a received email message, the device can fetch from a mail server (e.g., by way of an auto-more feature) text as needed. By only providing portions of the e-mail messages network and device resources are conserved. For example RFC 4550 entitled Internet Email to Support Diverse Service Environments (Lemonade) Profile defines extensions that allows mobile devices that are constrained in memory, bandwidth, processing power to efficiently use Internet Mail Access Protocol (IMAP) and Mail Submission protocols to access and submit mail. This includes the ability to forward received mail without needing to download and upload the mail, to optimize submission and conserve resources. Push-email based systems may only send parts or portions of an e-mail message to the device as required, for example only e-mail header information may be sent to the device until the user opens the message at which time the body or portions of the body may be downloaded for viewing based upon device resources or as the user scrolls through the e-mail.

In scenarios where an e-mail message is forwarded, or replied to with the addition of recipients, the user may not be aware of all the content in the email if it has not been downloaded to the device or viewed by the user, resulting in potentially sensitive information in the text of the e-mail being inadvertently sent to other recipients.

Accordingly, there is a need for systems and methods that prevent sending unread text of e-mail.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of the present disclosure there is provided a method of sending e-mail message from a wireless device at a server, the method comprising: receiving a request from the wireless device to forward the e-mail message to one or more recipients and a message identifier of an original e-mail message, one or more portions of a plurality of portions of the original e-mail message having been received at the wireless device; determining a portion indicator for the e-mail message associated with the request identifying the one or more portions being a subset of a plurality of portions of the original encrypted email message received at the wireless device; retrieving the determined one or more portions of the plurality of portions of the original e-mail message associated with the portion indicator, of the original e-mail message identified by the message identifier; and sending the determined one or more retrieved portions of the original e-mail message in a forwarded email message from the server to the one or more recipients.

In accordance with another aspect of the present disclosure there is provided a device for sending an e-mail message from a wireless device, the device comprising: a network interface; a processor; and a memory coupled to the processor containing instructions which when executed by the processor perform: receiving a request from the wireless device to forward the e-mail message to one or more recipients and a message identifier of an original e-mail message, one or more portions of a plurality of portions of the original e-mail message having been received at the wireless device; determining a portion indicator for the e-mail message associated with the request identifying the one or more portions being a subset of a plurality of portions of the original encrypted email message received at the wireless device; retrieving the determined one or more portions of the plurality of portions of the original e-mail message associated with the portion indicator, of the original e-mail message identified by the message identifier; and sending the determined one or more retrieved portions of the original e-mail message in a forwarded email message from the server to the one or more recipients.

In accordance with yet another aspect of the present disclosure there is provided a non-transitory computer readable memory containing instructions for execution by a processor on a server, the instructions which when executed by a processor perform: receiving a request from the wireless device to forward the e-mail message to one or more recipients and a message identifier of an original e-mail message, one or more portions of a plurality of portions of the original e-mail message having been received at the wireless device; determining a portion indicator for the e-mail message associated with the request identifying the one or more portions being a subset of a plurality of portions of the original encrypted email message received at the wireless device; retrieving the determined one or more portions of the plurality of portions of the original e-mail message associated with the portion indicator, of the original e-mail message identified by the message identifier; and sending the determined one or more retrieved portions of the original e-mail message in a forwarded email message from the server to the one or more recipients.

Embodiments are described below, by way of example only, with reference to FIGS. 1-10. To conserve data resources on a wireless device when forwarding or replying to a message, as an optimization, typically the contents of the original message are not sent from the wireless device to the wireless server and/or mail server. Only the newly typed message body and a pointer or message identifier to the original message is provided to the server to execute a forwarding or reply request. When a forward or reply request from a wireless device is initiated, the server then stitches together and/or combines the new message body with the original message body (the reference ID is used to find the original message body in the mailbox) and sends the message to the identified recipients.

For example, a typical reply message can look like this:
-------------
Here's some reply text
From: original sender
To: original recipient
Date: some date
Here's the original message Nothing under the "-------------" is sent from the device to the wireless server; rather the wireless server reads the contents of the original message from an associated user mailbox based upon a unique message identifier and inserts it into the new message. The use of the message identifier in the forward/reply request conserves resources by not requiring a device to provide the original message to the mail server, which already has the original message.

However, this can create security and usability problems. For example, it's typical that a user on a wireless device either won't have received all of the message text of the original message, and therefore by implication did not read all of the original text, or did receive the text but simply did not read it. If there is sensitive text in the original message body, and the user is forwarding the message along, that sensitive text may be read by parties who should not be seeing it. In addition, if the user is replying to the message, but in the reply adds additional recipients, the additional recipients may be able to read sensitive text that the sender did not intend. As described herein, the disclosed system and method prevents users from blindly or unknowingly adding the entire contents of the original message when forwarding or replying with new recipients, this successfully alleviates a security concern that the user may unintentionally send an e-mail message in a forward along sensitive text to recipients that was not intended or aware of.

Figure 1:
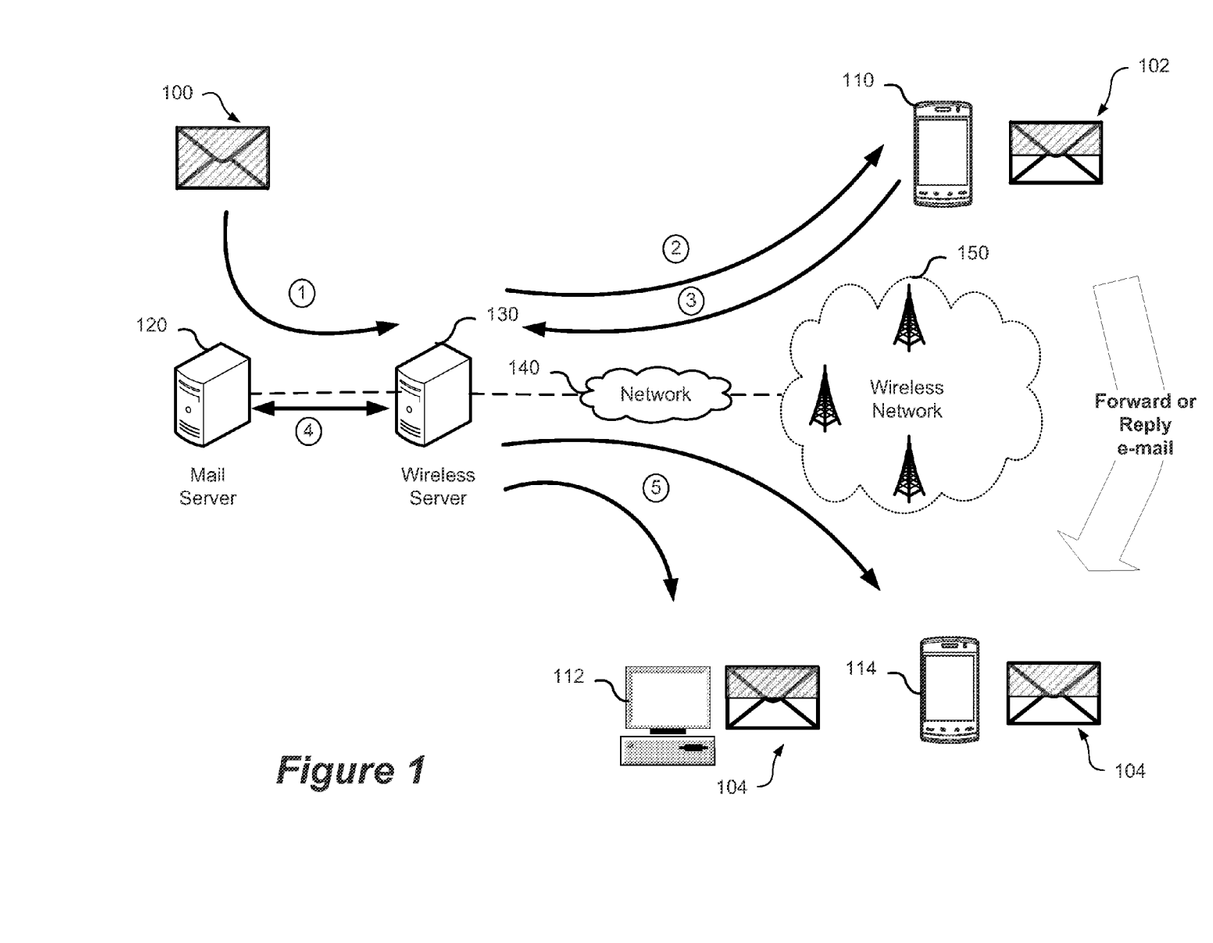
FIG. 1 shows a representation of sending e-mail in a forward or reply message from a wireless device.

FIG. 1 shows a representation of sending e-mail in a forwarding or reply message from a wireless device. An e-mail message 100 is delivered to a mail server 120 (1) and is identified to a wireless server 130 or gateway server, each comprising or using at least a processor and a memory to execute instructions. The wireless server 130 determines the destination user and the associated wireless device 110 and forwards portions (2) of the original e-mail message 100, as required or requested, to the wireless device 110. The mail server 130 is coupled to network 140, such as the Internet, and a wireless network 150. The mail server 120 or wireless server 130 may be directly coupled to the wireless network 150 or one or more through intermediary networks and may not be required on the same network. The received e-mail message 102 may therefore only contain portions of the original text (as indicated by hatching of the envelopes in the figures). The user then forwards, or replies to the e-mail message (3) by sending a request to the wireless server 130. The request includes a message identifier and a portion indicator to indentify the amount of the original e-mail delivered or viewed on the wireless device 110. The wireless server 130 can then retrieve the appropriate portions (4) from the user's mailbox on the mail server 120. The wireless server 130 then extracts and sends the indicated portions (5), and any additional text added by the user, to recipients 112 and 114, providing forwarded message 104 having only the portion(s) of the e-mail 102 requested. In this representation the wireless server 130 and mail server 120 are depicted as being separate operating entities however, their functions may be performed or integrated into the same server; they may reside as separate applications on the same device, or be incorporated into one application as required. The term server may be used to refer to the wireless server and/or the mail server.

Figure 2:
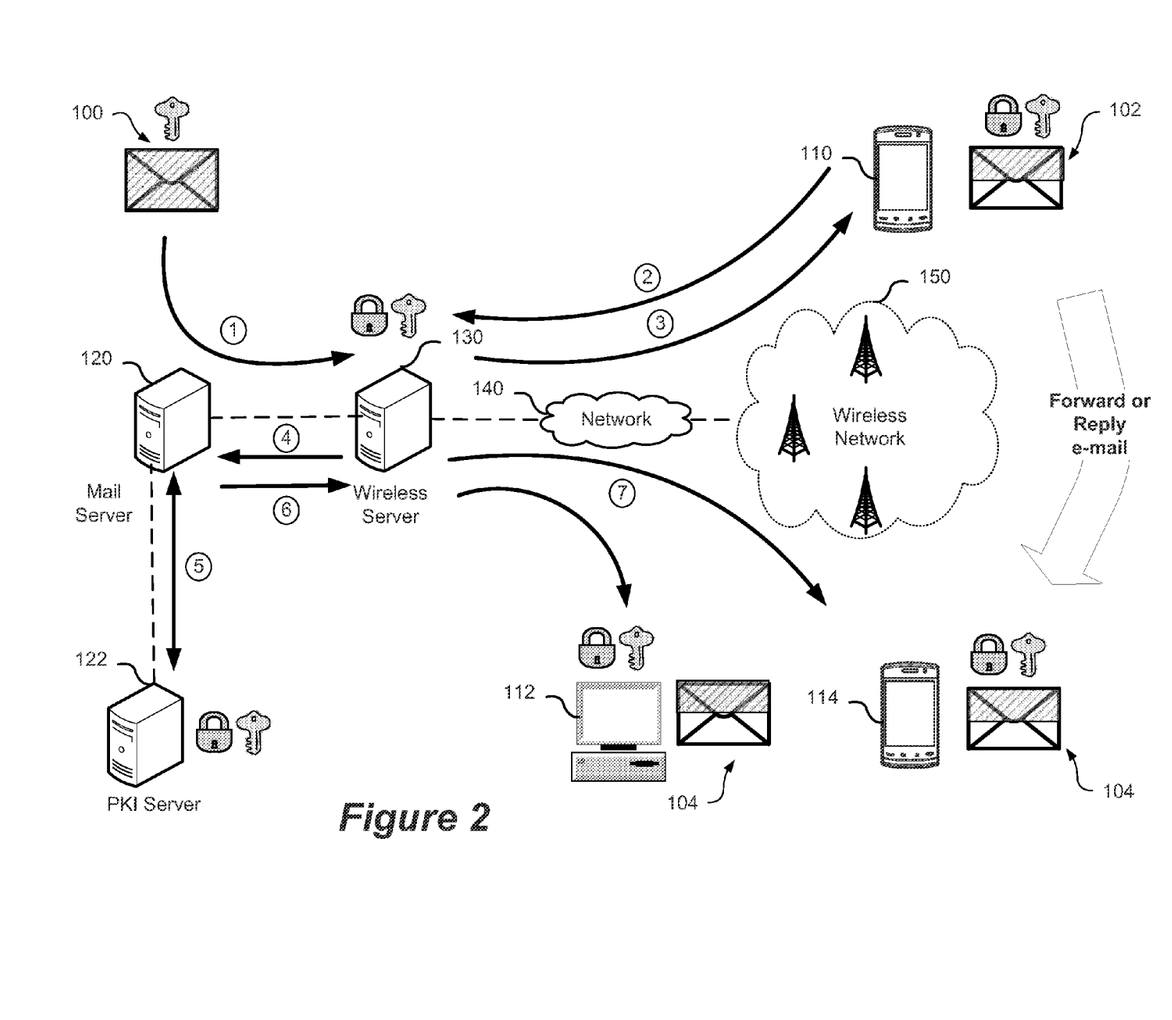
FIG. 2 shows a representation of sending encrypted e-mail in a forward or reply message from a wireless device.

FIG. 2 shows a representation of encrypted e-mail forwarding from a wireless device. An e-mail message 100, in this cases an encrypted e-mail message is delivered to a mail server 120 (1) and is identified to a wireless server 130. The e-mail message 100 may be encoded in a standard format such as Multipurpose Internet Mail Extensions (MIME) which is an Internet standard that extends the format of e-mail. MIME supports text in character sets other than ASCII, non-text attachments, message bodies with multiple parts, and header information in non-ASCII character sets. Alternatively the e-mail message 100 may be encrypted using a standard for public key encryption and signing such as Secure/Multipurpose Internet Mail Extensions (S/MIME) or other encryption technology. Note that in the case of S/MIME, the wireless device 110 may be required to send a key which allows the original message 100 being forwarded to be decrypted by the wireless server 130, so that the wireless server can retrieve the attachment contents. The key may be requested on a per e-mail message or reside on the wireless server 130 and associated with the user or wireless device. The wireless server 130 determines the destination user and the associated wireless device 110 and forwards portions (2) of the original e-mail message 100 as required to the wireless device 110 coupled to network 140, such as the Internet, and a wireless network 150. The received e-mail message 102 may only contain part of the original text based upon the received portions. The user then forwards, or replies to the e-mail message (3) by sending a request to the wireless server 130. The request includes a message identifier and a portion indicator to indentify the amount of the original e-mail delivered and/or an indicator of viewed portions on the wireless device 110 and new recipients. The wireless server 130 can then retrieve the appropriate portions (4) from the user's mailbox on the mail server 120, or a local mailbox if present on the wireless server 130. The mail server 120, or wireless server 130, may also use or receive keys from a public key infrastructure (PKI) server 122 (5). The requested message is then provided to the wireless server 130 (6). The wireless server 130 then extracts and sends the indicated portions (7), and any additional text added by the user, to recipients 112 and 144, providing forwarded message 104 having only the portion(s) of the e-mail 102 requested. Alternatively if the wireless server 130 cannot decrypt the message, portions may be determined relative to the encrypted message that was sent to the wireless device 110.

Figure 3:
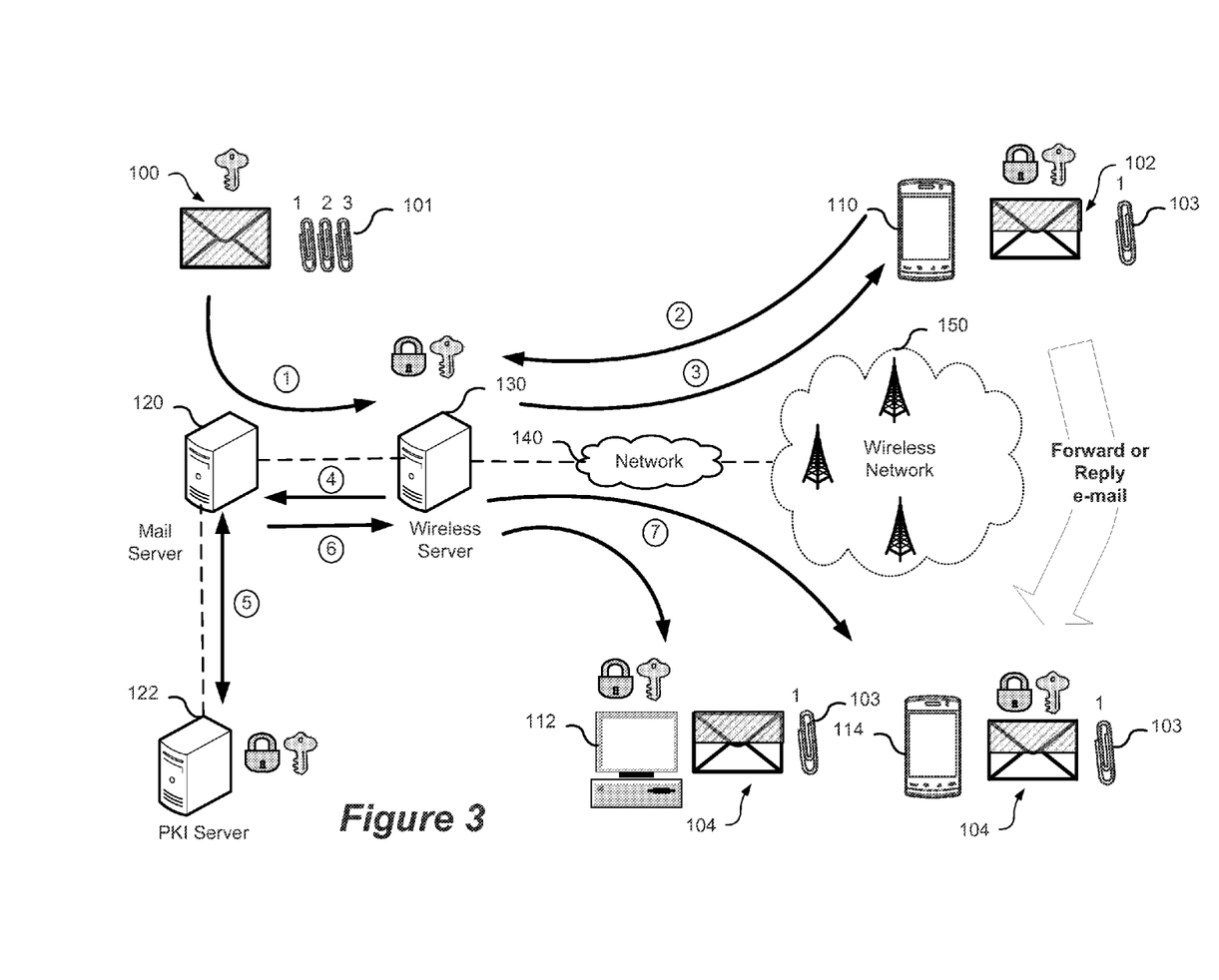
FIG. 3 shows a representation of sending encrypted e-mail in a forward or reply message when attachments are associated with the e-mail.

FIG. 3 shows a representation of encrypted e-mail forwarding when attachments are associated with the e-mail. FIG. 3 is similar to FIG. 2 with the addition that the e-mail message contains attachments provided within the body of the message. For example the original message 100 may have included three attachments 101, however the portions 102 sent to the wireless device 110 may only contain one attachment 103 being a subset of the original attachments 101. The forward, or reply e-mail 104, would therefore only contain the one attachment included 102. In this scenario the wireless device 110 may provide the decryption keys to the wireless server 130 or mail server 120, or they may be retrieved from a PKI server 122, so that the attachments may be extracted and reattached to the forward or reply message 104 or stored at the server. The wireless server 130 may optionally insert text indicating that the message was truncated at the given location.

Figure 4:
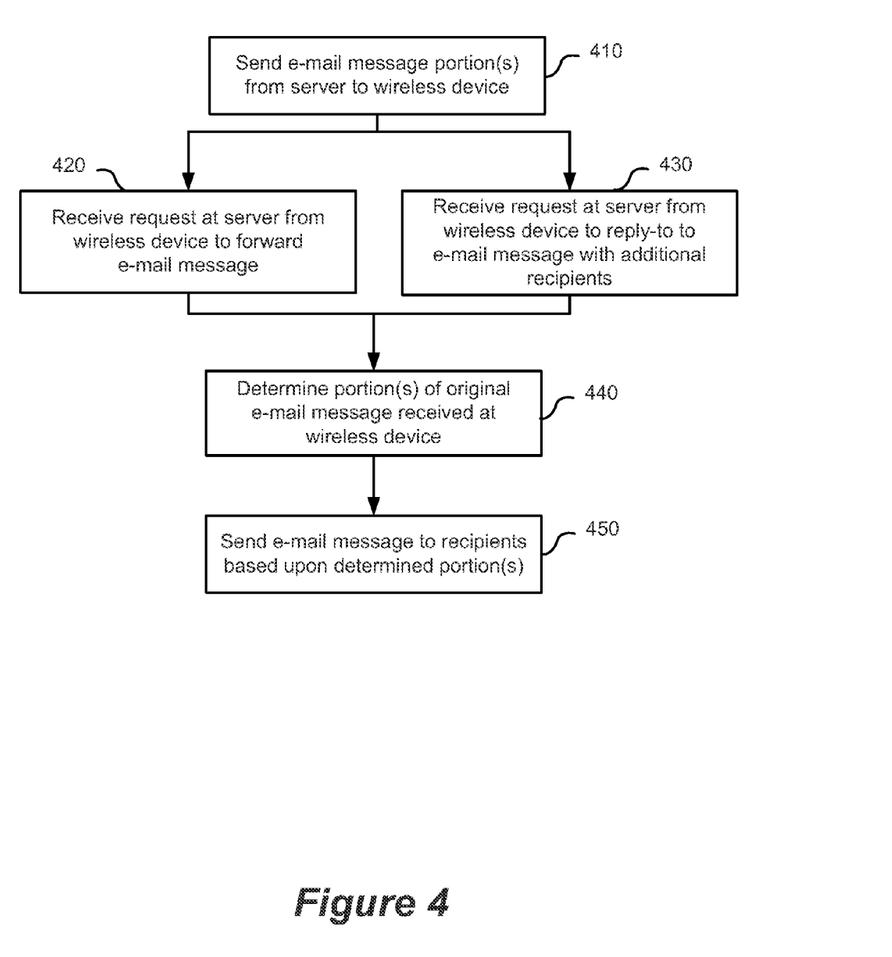
FIG. 4 shows a method sending e-mail in a forward or reply message.

FIG. 4 shows a method of sending e-mail by forwarding or replying from a wireless device and a server. E-mail messages are sent from a wireless server 130 to a wireless device 110 as portions of the original message as required (410). The portions are provided on an as needed basis to the wireless device 110. A request to forward the message (420) or reply-to the message where additional recipients are added to the message (430) is received from the wireless device 110 at the wireless server 130. The portion(s) of the original e-mail message that have been either received or viewed on the wireless device is determined (440) either by receipt of a portion indicator from the wireless device or by the server determining which portions were sent to the wireless device. The wireless server can then retrieve the identified message and send the portions of the message, including additional text added by the user, to the identified recipients (450). Note that in the case that the user is replying to a message, the wireless device 110 or wireless server 130 could determine whether recipients are actually being added to the message as if no recipients are being added, then it can be assumed that the original sender has already seen all of the text and there is no need to restrict sending the original message.

Figure 5:
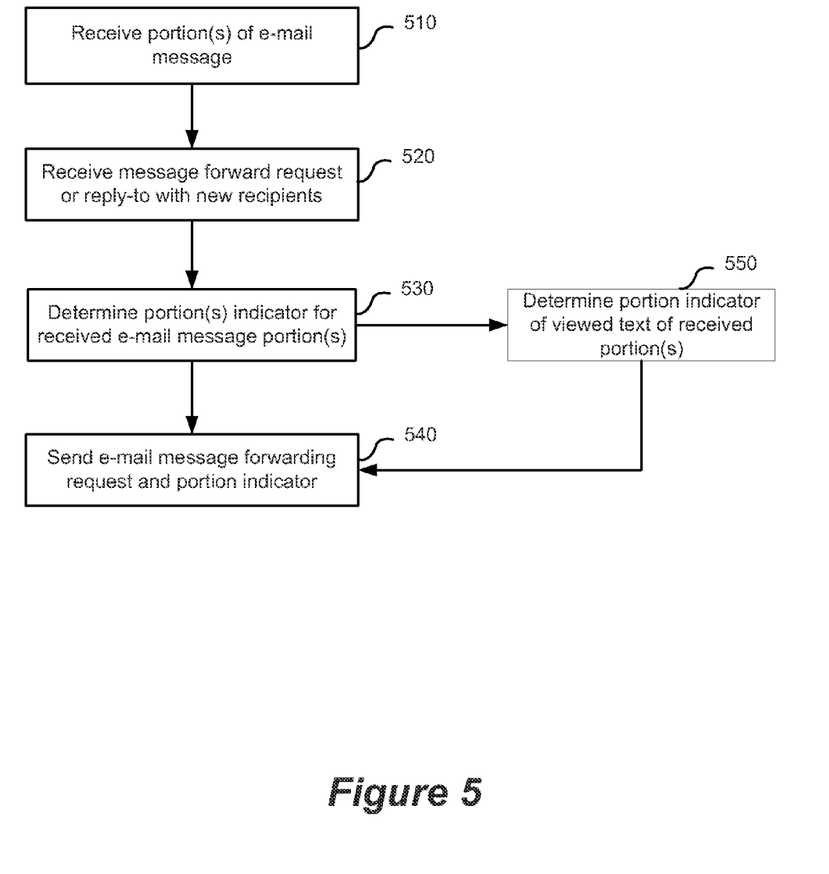
FIG. 5 shows a method of sending e-mail in a forward or reply message from a wireless device.

FIG. 5 shows a method of e-mail forwarding from a wireless device. The wireless device receives one or more portions of the e-mail message (510) from the wireless server in a e-mail application of web-based mail application executed on a processor of the wireless device. The user requests that an message be forwarded or replied-to, with added recipients (520). In this example, a portion indicator is determined by the wireless device to identify the amount of the original e-mail received from the server (530). The portion indicator may be the size or a count of the number of portions received. Alternatively, the portion indicator may be additionally be determined based upon the amount of message text or content actually viewed or displayed on the device to the user prior to initiating the forward or reply request by determining a viewing metric for example, has the user viewed the text for a certain period of time, has the user scrolled by the text, etc. If the text has only been briefly viewed, the text may not be forwarded or a warning displaying the associated metric may be provided before sending. The e-mail forwarding request, is then sent to the server (540) including the added text from the user (if any), a message identifier, and the portion indicator. The server only includes the text from the original message that the device identified by the portion indicator. Alternatively, if the device does not provide a portion indicator to the server, the server may determine the portion of e-mail that was provided to the wireless device and only forward the downloaded portions.

Figure 6:
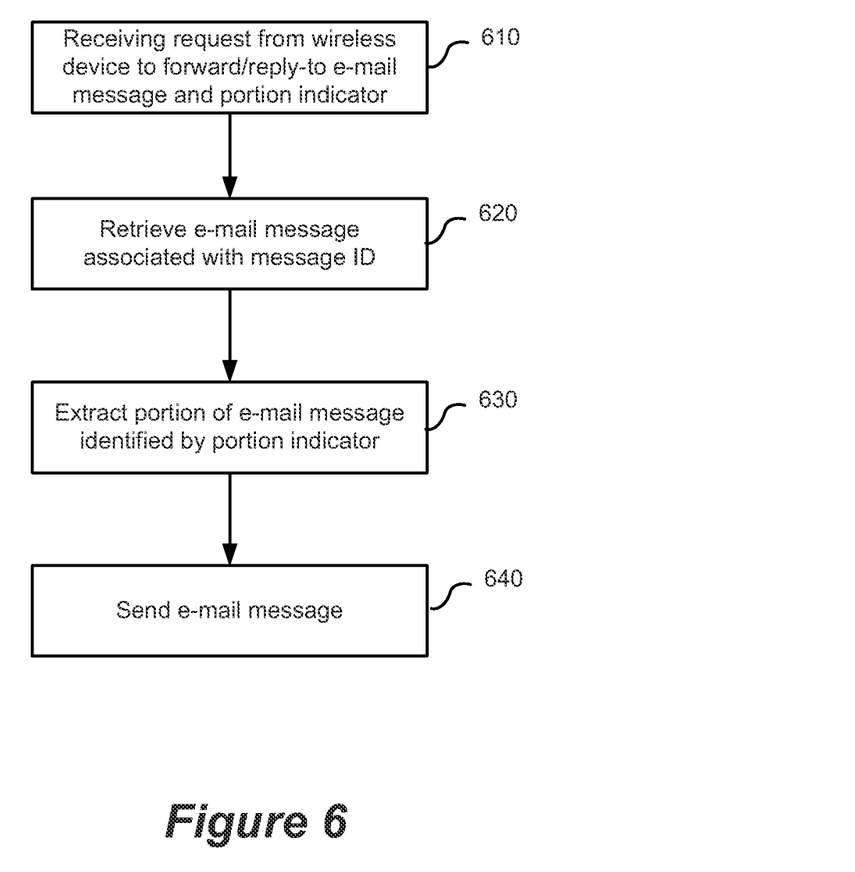
FIG. 6 shows a method at a server of sending e-mail in a forward or reply message from a wireless device.

FIG. 6 shows a method at a wireless server of e-mail forwarding from a wireless device. The wireless server receives a request to forward, or reply with new recipients from the wireless device 110 (610). The request includes the message identifier of the original message and may include a portion indicator if provided by the wireless device 110. The wireless server 130 can then retrieve the original message from a mailbox associated with the user (620) either locally or via a mail server 120. If the portion indicator is not provided by the wireless device 110 it may be determined by the server based upon the portions of the original e-mail message that were sent to the wireless device 110 as discussed in FIG. 7. The portion(s) of the e-mail message identified by the portion indicator is then extracted from the original e-mail message (630) and sent to the identified recipients (640) with the added text from the user. If the e-mail message is encrypted the server may request or retrieve decryption keys to extract attachments within the message for inclusion to the forwarded message. Only attachments that fall within the portions indicator of the message will be forwarded.

Figure 7:
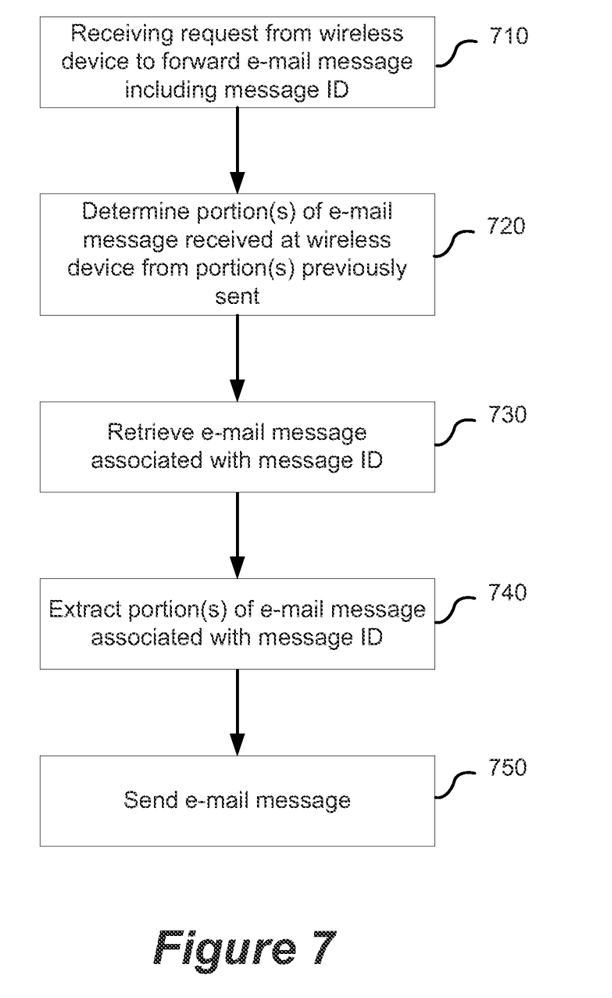
FIG. 7 shows a method at a server of sending e-mail in a forward or reply message from a wireless device where the server determines the portion of the e-mail message to be sent.

FIG. 7 shows a method at a wireless server of e-mail forwarding from a wireless device where the wireless server determines the portion of the e-mail message to be forwarded. The wireless server 130 receives a request to forward, or reply with new recipients from the wireless device 110 (710). The request includes the message identifier associated with the original e-mail in the user's mailbox on the mail server 120. The wireless server 130 then determines the one or more portions of the original e-mail that have been previous delivered to the wireless device 110 (720). The wireless server 130 can then retrieve the original message from a mailbox associated with the user (730) either coupled to the server or through an associated mail server. The portion(s) of the original e-mail message determined by the wireless server 130 as being sent to the wireless device 110 are then extracted from the original e-mail message (740) and sent to the identified recipients (750) with the added text from the user. If the e-mail message contains attachments within the message, an encryption key may be provided to the wireless server 130 or authorized for retrieval by the user, so that the server can extract the attachments for inclusion to the forwarded message. Only attachments that fall within the portions indicator of the message will be forwarded.

Forwarding/replying e-mail based upon a portion indicator may be applied to all e-mail or selectively enabled on the wireless device. Alternatively, the method may be implemented based on the type of e-mail or content contained therein. For example, the portion indicator may be applied to encrypted e-mail, any e-mail with a particular security or sensitive categorization, provided within the MIME encoding or within the message in the subject line or body. The indicator may also be applied based upon destinations or domains associated with the e-mail recipients. In determining if only portions of the e-mail is to be forwarded the server may determine properties associated with recipients before determining the portion indicator, that is if the recipients are within a trusted domain, or if particular recipients are deemed trusted the entire e-mail message may be forwarded without requiring determination of the portion indicator.

Figure 8:
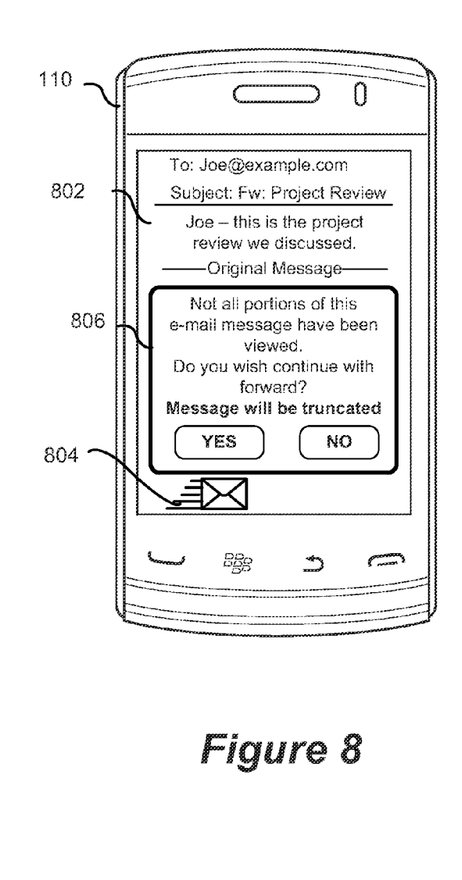
FIG. 8 shows a representation of a confirmation screen when sending an e-mail in a forward or reply message from a wireless device.

FIG. 8 shows a representation of a confirmation screen when sending an e-mail in a forward or reply message from a wireless device. In this example wireless device 110 has a screen 802 that is displaying a message that a user is in the process of forwarding to a new recipient. When the user initiates a send, for example by actuating a send icon 804, a notification 806 may be provided to indicate that not all portions of the e-mail has been received, and therefore not been viewed and will not be included in the forwarded e-mail. In the case of a reply to an e-mail, the notification would only be presented if additional recipients are being added to the e-mail message as it would be assumed that it is acceptable for the original sender to receive the full message.

Figure 9:
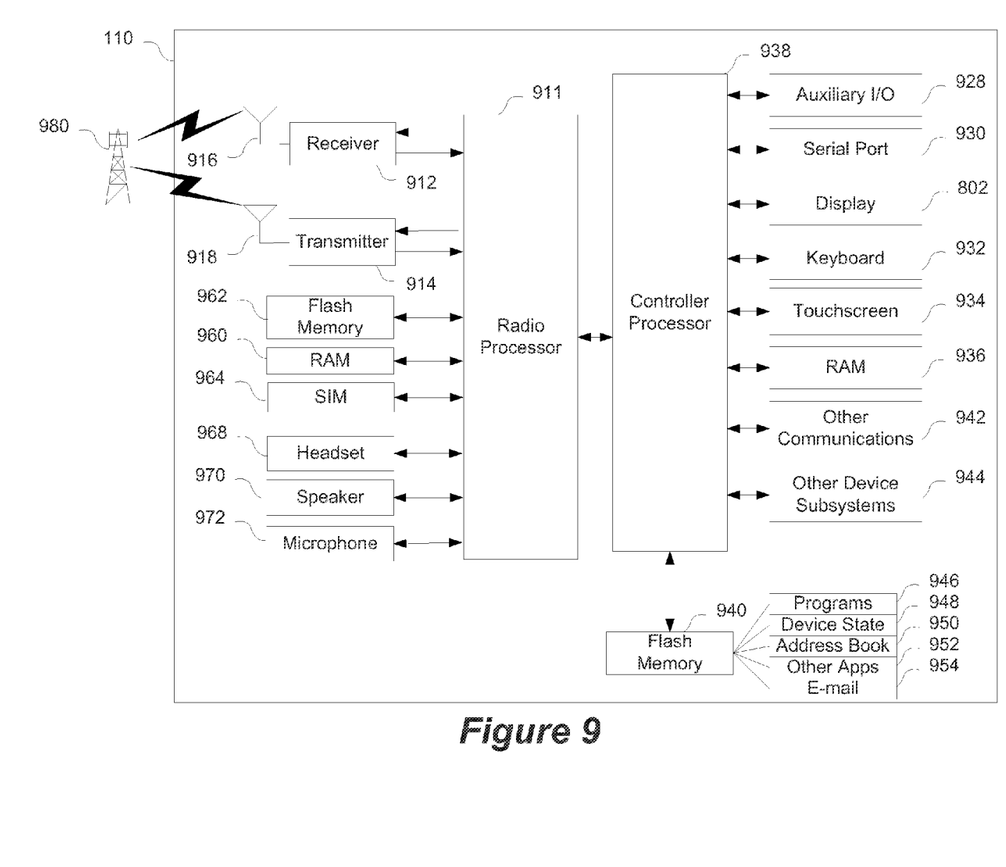
FIG. 9 shows a schematic representation of a wireless device.

FIG. 9 is a block diagram of a wireless device for replying/forwarding of e-mail, in particular a wireless device 110 is shown incorporating a communication subsystem having both a receiver 912 and a transmitter 914 as well as associated components such as one or more embedded or internal antenna elements 916 and 918. The device may be a portable communication device such as a tablet, smart phone, mobile computing device, netbook, laptop computer, notebook computer capable of providing or accessing e-mail applications or e-mail functionality. The particular design of the communication subsystem will be dependent upon the communication network in which the device is intended to operate. The network may be short-range, local area network, or a wide area network accessible by different access technology or standards, such as but not limited to WiFi, IEEE 802.11 based technologies, GSM, CDMA, HSPDA, LTE, Wi-Max or by accessing a network connection via an intermediary device such as by tethering or bridging functionality.

When required network registration or activation procedures have been completed, wireless device 110 may send and receive communication signals over a wireless network 980. Signals received by antenna 916 are input to receiver 912, which may perform such common receiver functions as signal amplification, frequency down conversion, channel selection and the like. Radio processor 911 interacts with receiver 912 and transmitter 914, and further with flash memory 962, random access memory (RAM) 960, the subscriber identity module 964, a headset 968, a speaker 970, and a microphone 972.

Microprocessor 938 interacts with further device subsystems such as the display 802, flash memory 940, random access memory (RAM) 936, auxiliary input/output (I/O) subsystems 928, serial port 930, keyboard 932, input devices such as a touch screen or touch input device 934, other communications 942 and other device subsystems generally designated as 944.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list. Additionally certain components may be combined, for example, the keyboard 932 and the display 922 may be combined as a single component such as a touch screen.

Software used by radio processor 911 and microprocessor 938 is stored in a persistent store such as flash memory 940 and 962, which may instead be a read-only memory (ROM) or similar storage element (not shown). Those skilled in the art will appreciate that the operating system, specific device applications, or parts thereof, may be temporarily loaded into a volatile memory such as RAM 936 and RAM 960. Received communication signals may also be stored in RAM 936.

As shown, flash memory 940 can be segregated into different areas for computer programs 946, device state 948, address book 950, other applications 952 and e-mail programs 954. The e-mail programs 954 may also manage encryption and decryption key management or may be managed by a separate, program, service or application. These different storage types indicate that each program can allocate a portion of flash memory 940 for their own data storage requirements. Microprocessor 938, in addition to its operating system functions, preferably enables execution of software applications on the wireless device For voice communications, overall operation of wireless device 110 is similar, except that received signals would preferably be output to the speaker 970 or headset 968 and signals for transmission would be generated by the microphone 972. Alternative voice or audio I/O subsystems, such as a voice message recording subsystem, may also be implemented on wireless device 110.

Other device subsystems 944, such as a short-range communications subsystem, is a further optional component which may provide for communication between wireless device 110 and different systems or devices, which need not necessarily be similar devices. For example, the subsystem 944 may include an infrared device and associated circuits and components or a Bluetooth™ communication module to provide for communication with similarly enabled systems and devices.

Figure 10:
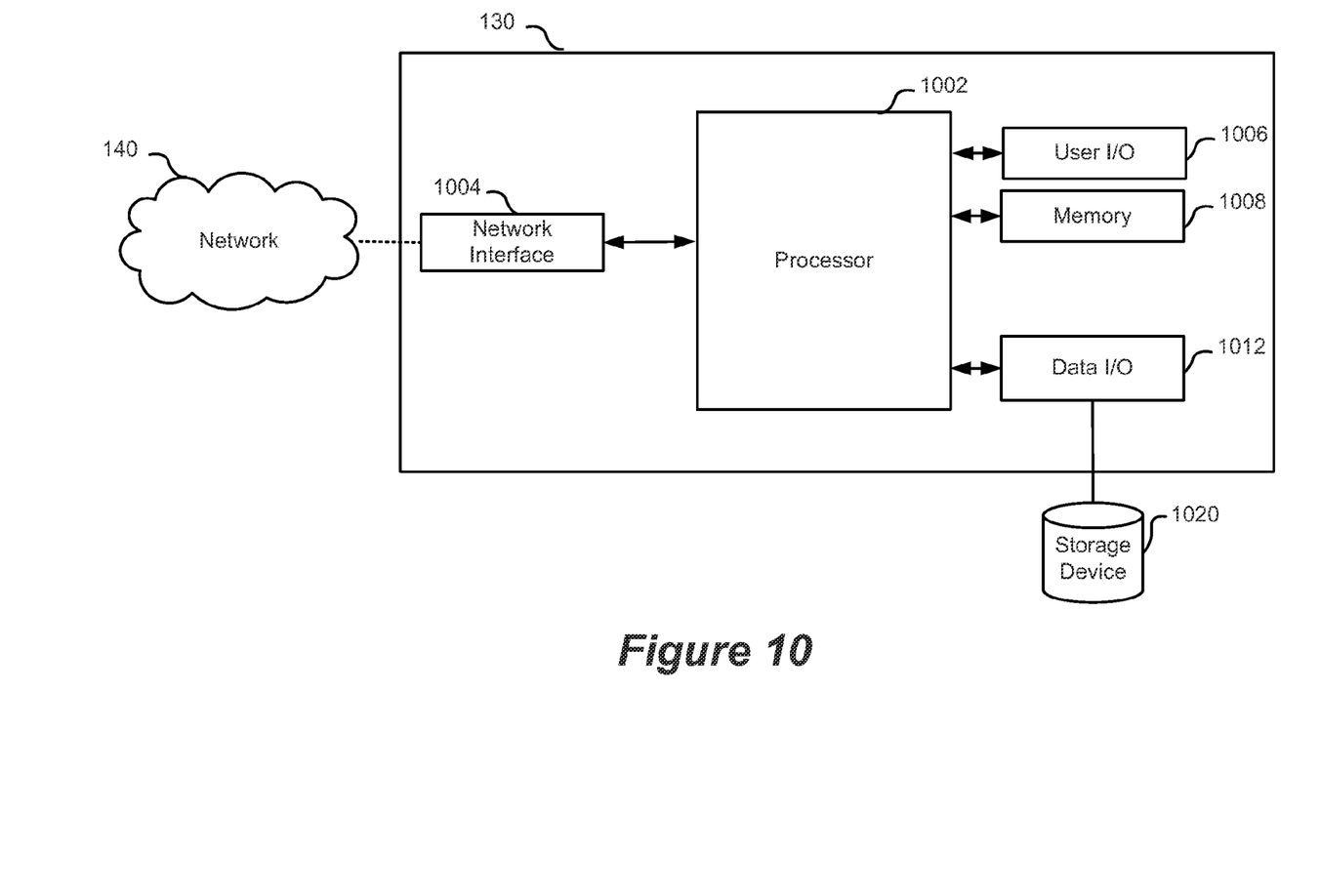
FIG. 10 show a schematic representation of a wireless server.

FIG. 10 show a schematic representation of a wireless server. The server 130 has at least a processor 1002 for processing instructions retrieved from internal memory 1008 or external storage device 1020 through a data input/output interface 1012. The processor 1002 interfaces via a network interface 1004 with one or more networks 140 for sending and receiving e-mail messages to and from the wireless devices. The network interface may be a wired interface, such as Ethernet or a wireless interface or utilize a combination thereof. A user input/output interface 1006 may be provided to enable programming or interaction with the server may also be provided. The memory 1008 or storage device 1020 may contain instructions for managing e-mail delivery to wireless devices, portion tracking and logic for determining e-mail portions to be forwarded as defined by the described methods. Mail server 120 functions may also be incorporated in the wireless 130 such as mailbox processing and management.

The system and methods according to the present disclosure may be implemented by any hardware, software or a combination of hardware and software having the above described functions. The software code, either in its entirety or a part thereof, may be stored in a computer-readable memory or non-transitory computer readable medium. Further, a computer data program representing the software code may be embodied on a computer-readable memory.

While a particular embodiment of the present system and methods for forwarding e-mail message attachments from a wireless device have been described herein, it will be appreciated by those skilled in the art that changes and modifications may be made thereto without departing from the disclosure in its broadest aspects and as set forth in the following claims.

The invention claimed is:

1. A method of sending an email message from a wireless device at a server, the method comprising:
receiving a request from the wireless device to forward the e-mail message to one or more recipients and a message identifier of an original e-mail message, one or more portions of a plurality of portions of the original e-mail message having been received at the wireless device;
determining a portion indicator for the e-mail message associated with the request, the portion indicator indicating the one or more portions of the plurality of portions of the original e-mail message sent from the server to the wireless device prior to receiving the request to forward or reply to the e-mail, the determining the portion indicator further comprising receiving an indicator of an amount of text of the e-mail message from the one or more portions that was displayed on the wireless device, wherein only the one or more portions that were displayed on the device are retrieved and sent in the forwarded e-mail message;

retrieving the determined one or more portions of the plurality of portions of the original e-mail message associated with the portion indicator of the original e-mail message identified by the message identifier;

sending the determined one or more retrieved portions of the original e-mail message in a forwarded email message from the server to the one or more recipients; and appending text to the forwarded e-mail message that is sent to the one or more recipients to identify that the original e-mail message was truncated.

2. The method of claim 1 wherein the e-mail message is an encrypted email message, the one or more portions being decrypted at the wireless device.

3. The method of claim 2 wherein the retrieved one or more portions are decrypted at the server and re-encrypted before being sent to the one or more recipients.

4. The method of claim 3 wherein the forwarded e-mail message is re-encrypted using an encryption key associated with one or more of the recipients.

5. The method of claim 3 wherein the request further comprises appending text to be added to the forwarded e-mail message provided in the forwarding request.

6. The method of claim 3 wherein the encrypted e-mail message is a Secure/Multipurpose Internet Mail Extensions (S/MIME) format message.

7. The method of claim 6 further comprising receiving from the wireless devices a decryption key to the wireless server to decrypt the plurality of portions of the original e-mail message.

8. The method of claim 6 further comprising retrieving decryption key is retrieved from a public key infrastructure (PKI) server to decrypt the plurality of portions of the original e-mail message.

9. The method of claim 6 further comprising requesting from the wireless device an encryption key to decrypt an attachments in the one or more portions of the e-mail message.

10. A device for sending an e-mail message from a wireless device, the device comprising:
a network interface;
a processor; and
a memory coupled to the processor containing instructions which when executed by the processor perform:
receiving a request from the wireless device to forward the e-mail message to one or more recipients and a message identifier of an original e-mail message, one or more portions of a plurality of portions of the original e-mail message having been received at the wireless device;
determining a portion indicator for the e-mail message associated with the request, the portion indicator indicating the one or more portions of the plurality of portions of the original e-mail message sent from the server to the wireless device prior to receiving the request to forward or reply to the e-mail, the determining the portion indicator further comprising receiving an indicator of an amount of text of the e-mail message from the one or more portions that was displayed on the wireless device, wherein only the one or more portions that were displayed on the device are retrieved and sent in the forwarded e-mail message;

retrieving the determined one or more portions of the plurality of portions of the original e-mail message associated with the portion indicator of the original e-mail message identified by the message identifier;

sending the determined one or more retrieved portions of the original e-mail message in a forwarded email message from the server to the one or more recipients; and appending text to the forwarded e-mail message that is sent to the one or more recipients to identify that the original e-mail message was truncated.

11. A non-transitory computer readable memory containing instructions for execution by a processor on a server, the instructions which when executed by a processor perform:
receiving a request from the wireless device to forward the e-mail message to one or more recipients and a message identifier of an original e-mail message, one or more portions of a plurality of portions of the original e-mail message having been received at the wireless device;
determining a portion indicator for the e-mail message associated with the request, the portion indicator indicating the one or more portions of the plurality of portions of the original e-mail message sent from the server to the wireless device prior to receiving the request to forward or reply to the e-mail, the determining the portion indicator further comprising receiving an indicator of an amount of text of the e-mail message from the one or more portions that was displayed on the wireless device, wherein only the one or more portions that were displayed on the device are retrieved and sent in the forwarded e-mail message;

retrieving the determined one or more portions of the plurality of portions of the original e-mail message associated with the portion indicator of the original e-mail message identified by the message identifier;

sending the determined one or more retrieved portions of the original e-mail message in a forwarded email message from the server to the one or more recipients; and appending text to the forwarded e-mail message that is sent to the one or more recipients to identify that the original e-mail message was truncated.

12. The non-transitory computer readable memory of claim 11 wherein the e-mail message is an encrypted email message, the one or more portions being decrypted at the wireless device.

13. The non-transitory computer readable memory of claim 12 wherein the retrieved one or more portions are decrypted at the server and re-encrypted before being sent to the one or more recipients.

14. The non-transitory computer readable memory of claim 13 wherein the forwarded e-mail message is re-encrypted using an encryption key associated with one or more of the recipients.

15. The non-transitory computer readable memory of claim 13 wherein the request further comprises appending text to be added to the forwarded e-mail message provided in the forwarding request.

16. The non-transitory computer readable memory of claim 13 wherein the encrypted e-mail message is a Secure/Multipurpose Internet Mail Extensions (Si/MIME) format message.

17. The non-transitory computer readable memory of claim 13 further comprising receiving from the wireless devices a decryption key to the wireless server to decrypt the plurality of portions of the original e-mail message.

18. The non-transitory computer readable memory of claim 13 further comprising retrieving a decryption key' from a public key infrastructure (PKI) server to decrypt the plurality of portions of the original e-mail message.

19. The non-transitory computer readable memory of claim 13 further comprising requesting from the wireless device an encryption key to decrypt an attachments in the one or more portions of the e-mail message.

* * * * *

UNITED STATES PATENT AND TRADEMARK OFFICE
CERTIFICATE OF CORRECTION

| | | Page 1 of 1 |
|---|---|---|
| PATENT NO. | : 9,225,524 B2 | |
| APPLICATION NO. | : 14/287157 | |
| DATED | : December 29, 2015 | |
| INVENTOR(S) | : Ravi Singh et al. | |

It is certified that error appears in the above-identified patent and that said Letters Patent is hereby corrected as shown below:

On the title page, Column 1 (Related U.S. Application Data); Line 3, please delete Provisional application No. "60/408,240" and insert --61/408,240--.

In the Claims

Column 10, Line 64, In Claim 16, please delete "Si/MME" and insert --S/MIME--.

Signed and Sealed this
Twenty-sixth Day of April, 2016

Michelle K. Lee
*Director of the United States Patent and Trademark Office*